(12) United States Patent
Lim

(10) Patent No.: US 10,693,904 B2
(45) Date of Patent: Jun. 23, 2020

(54) SYSTEM AND METHOD FOR INFORMATION SECURITY THREAT DISRUPTION VIA A BORDER GATEWAY

(71) Applicant: Certis CISCO Security Pte Ltd, Singapore (SG)

(72) Inventor: Keng Leng Albert Lim, Singapore (SG)

(73) Assignee: CERTIS CISCO SECURITY PTE LTD, Singapore (SG)

( * ) Notice: Subject to any disclaimer, the term of this patent is extended or adjusted under 35 U.S.C. 154(b) by 62 days.

(21) Appl. No.: 14/893,668

(22) PCT Filed: Mar. 18, 2015

(86) PCT No.: PCT/SG2015/050040
§ 371 (c)(1),
(2) Date: Nov. 24, 2015

(87) PCT Pub. No.: WO2016/148641
PCT Pub. Date: Sep. 22, 2016

(65) Prior Publication Data
US 2016/0277436 A1     Sep. 22, 2016

(51) Int. Cl.
*H04L 29/06*     (2006.01)
(52) U.S. Cl.
CPC ...... *H04L 63/1441* (2013.01); *H04L 63/0236* (2013.01); *H04L 63/101* (2013.01); *H04L 63/1416* (2013.01)
(58) Field of Classification Search
CPC ............ H04L 63/1441; H04L 63/0236; H04L 63/101
See application file for complete search history.

(56) References Cited

U.S. PATENT DOCUMENTS 7,051,369 B1 *   5/2006   Baba ...................... H04L 63/02
                                                         726/22
7,434,254 B1    10/2008   Foschiano et al.
(Continued)

OTHER PUBLICATIONS

Mujtaba, Muhammad; Nanda, Priyadarsi; He, Xiangjian; "Border Gateway Protocol Anomaly Detection using Failure Quality Control Method", 11th International Conference on Trust, Security and Privacy in Computing and Communications, IEEE, Jun. 25-27, 2012, pp. 1239-1244.*

(Continued)

*Primary Examiner* — Victor Lesniewski
(74) *Attorney, Agent, or Firm* — Pearl Cohen Zedek Latzer Baratz LLP

(57) ABSTRACT

A system and method for disrupting an information security threat that constitutes an attack on a computer asset in a computer network is provided. The provided system and method disrupts this information security threat after the attack on the computer asset has been detected by at least one of the monitoring devices on the affected computer network. An intermediate upstream gateway of the affected computer network is then utilized to disrupt this information security threat. As the detected attack is being disrupted, a mitigation action will be automatically initiated if a mitigation action associated with the attack is stored in the system's database; else information about the attack will be sent to a central command centre for further assessment. At the central command centre, a mitigating action will be further developed and executed to address the intention of the attack.

18 Claims, 6 Drawing Sheets

(56) References Cited

U.S. PATENT DOCUMENTS

| | | | | |
|---|---|---|---|---|
| 7,610,624 | B1* | 10/2009 | Brothers | H04L 63/145 709/223 |
| 8,056,130 | B1 | 11/2011 | Njemanze et al. | |
| 8,085,681 | B2* | 12/2011 | Raftelis | H04L 63/1441 370/235 |
| 8,499,348 | B1* | 7/2013 | Rubin | G06F 21/554 713/154 |
| 8,528,041 | B1* | 9/2013 | Haney | H04L 63/101 713/151 |
| 8,561,187 | B1* | 10/2013 | Hegli | H04L 63/1491 726/22 |
| 8,621,065 | B1* | 12/2013 | Saurel | H04L 63/1466 709/200 |
| 8,832,833 | B2* | 9/2014 | Demopoulos | G06F 21/552 726/23 |
| 8,881,281 | B1* | 11/2014 | Mitchell | H04L 63/1425 709/217 |
| 8,914,878 | B2* | 12/2014 | Burns | H04L 63/1441 726/13 |
| 9,118,711 | B2* | 8/2015 | Oliphant | G06F 16/245 |
| 9,571,511 | B2* | 2/2017 | Nelms | H04L 63/1425 |
| 2002/0166063 | A1* | 11/2002 | Lachman, III | H04L 63/0263 726/23 |
| 2004/0030923 | A1* | 2/2004 | Tindal | H04L 63/0823 726/1 |
| 2004/0103314 | A1 | 5/2004 | Liston et al. | |
| 2005/0138425 | A1* | 6/2005 | Kim | H04L 63/1408 726/4 |
| 2005/0144467 | A1* | 6/2005 | Yamazaki | H04L 63/0227 713/189 |
| 2005/0198519 | A1* | 9/2005 | Tamura | H04L 63/1458 713/188 |
| 2006/0010389 | A1* | 1/2006 | Rooney | H04L 63/1425 715/736 |
| 2006/0077964 | A1* | 4/2006 | Wu | H04L 41/0893 370/352 |
| 2006/0119486 | A1* | 6/2006 | Kim | G06F 21/552 340/6.1 |
| 2006/0282893 | A1* | 12/2006 | Wu | H04L 63/1441 726/23 |
| 2008/0127324 | A1* | 5/2008 | Seo | H04L 63/1458 726/13 |
| 2008/0181100 | A1* | 7/2008 | Yang | H04L 41/0681 370/216 |
| 2010/0242084 | A1* | 9/2010 | Keeni | H04L 63/20 726/1 |
| 2010/0262688 | A1* | 10/2010 | Hussain | H04L 63/1433 709/224 |
| 2012/0072574 | A1* | 3/2012 | Wang | H04L 41/142 709/224 |
| 2013/0067560 | A1 | 3/2013 | Zuk et al. | |
| 2014/0245439 | A1* | 8/2014 | Day | G06F 21/552 726/23 |
| 2014/0283030 | A1* | 9/2014 | Moore | H04L 63/0236 726/22 |
| 2015/0135316 | A1* | 5/2015 | Tock | G06F 21/566 726/23 |
| 2015/0135317 | A1* | 5/2015 | Tock | G06F 21/56 726/23 |
| 2015/0222652 | A1* | 8/2015 | Ramsey | G06F 16/22 726/23 |
| 2016/0036837 | A1* | 2/2016 | Jain | H04L 63/1416 726/23 |

OTHER PUBLICATIONS

Deshpande, S.; Thottan, M.; Sikdar, B.; "Early Detection of BGP Instabilities Resulting from Internet Worm Attacks", IEEE Global Telecommunications Conference (GLOBECOM), Nov. 29-Dec. 3, 2004, pp. 2266-2270.*

International Search Report for International Application No. PCT/SG2015/050040, Search completed Jun. 2, 2015, dated Jun. 2, 2015, 3 Pgs.

International Preliminary Report on Patentability from Australian Patent Office dated May 31, 2017 for relating International Application No. PCT/SG2015/050040.

Extended European Search Report from EPO dated Nov. 24, 2017 for relating European Application No. 15796998.1.

* cited by examiner

SYSTEM AND METHOD FOR INFORMATION SECURITY THREAT DISRUPTION VIA A BORDER GATEWAY

CROSS REFERENCE TO RELATED APPLICATIONS

This application is a national stage application of PCT Application No. PCT/SG2015/050040 filed on Mar. 18, 2015, the disclosure of which is hereby incorporated by reference in its entirety.

FIELD OF THE INVENTION

This invention relates to a system and method for disrupting an information security threat that constitutes an attack on a computer asset in a computer network. More particularly, this invention relates to a system and method for disrupting this information security threat after the attack on the computer asset has been detected by at least one of the monitoring devices on the affected computer network. An intermediate upstream gateway of the affected computer network is then utilized to disrupt this information security threat. The detected security threat is disrupted at the intermediate upstream gateway for a period of time by automatically blocking the Internet Protocol (IP) address of the source of the attack from transmitting further data to the computer network. After this period of time has lapsed, the IP address of the source will be automatically unblocked. As the detected attack is being disrupted, a mitigation action will be automatically initiated if a mitigation action associated with the attack is stored in the system's database; else information about the attack will be sent to a central command centre for further assessment. At the central command centre, a mitigating action will be further developed and executed to address the intention of the attack.

SUMMARY OF THE PRIOR ART

The management of a computer network's security is becoming more challenging as computer networks grow in size and as computer networks become an integral part of most organizations' daily operations. As the number of computers within an organization's computer network is ever increasing, there is a higher likelihood of computer network misconfiguration and mismanagement thereby allowing attackers to gain unauthorized access and steal information from the computer network. Due to the advancements in computing technology, attacks on computer networks are becoming increasingly sophisticated, making it difficult for existing security management tools to respond to these attacks in a real time manner. Furthermore, if an attack on a computer network is stopped or repelled, without continuous vigilance and monitoring, the computer network will still not be immune to similar attacks as attackers will naturally be compelled to attempt new attack methodologies to gain unauthorized access to the same secured computer networks. Therefore, maintaining and managing the network security of a computer network is an ever evolving complex problem.

Attacks on a computer asset within a computer network may occur in the form of wiretapping, network sniffing, viruses, malwares, IP spoofing, Trojan horses, Denial of Service attacks or any other such similar methods. Furthermore, such information security attacks may be sent in the form of multiple data packets across the IP networks as the original larger data packets would have been fragmented into multiple smaller data packets as they are transmitted. The multiple smaller data packets will then recombine once all the data packets arrive at their intended target. If some of these smaller data packets do not arrive at their intended target, this would result in an incomplete final data packet that would typically be rejected by a computing device as such incomplete data packets would be treated as corrupted data packets.

The main objective of such attack methodologies would be to damage computer assets within the computer network resulting in the computer network's users losing access to information contained within the computer network and/or to steal confidential information contained within the servers or computers located within the computer network. Irrespective of the intent of the attack, such attacks have to be quickly stopped and repelled upstream before lasting damage occurs.

Of particular concern to network administrators is the speed at which an attack on a computer network can take place and spread through the network of computers. Most computer networks utilize routers, gateways and/or firewalls to prevent such attacks from accessing computers located behind the firewall. A firewall is typically used to secure a local area computer network from users that are located outside the local area network. The firewall does this by monitoring the incoming and outgoing traffic from the local area network. The firewall does this by checking, and frequently labelling messages sent to or from users outside the local trusted area network.

However, the problem faced by existing systems and methods is that known attacks and their associated mitigating actions are only periodically loaded into the firewalls. Thus, a new passive or active attack may potentially be undetectable. By the time network administrators react to these new attacks, the damage would already have been done long ago. For the above reasons, those skilled in the art are constantly striving to come up with a system and method to manage the security of a computer network in an efficient and high speed manner.

SUMMARY OF THE INVENTION

The above and other problems are solved and an advance in the art is made by systems and methods provided by embodiments in accordance with the invention. A first advantage of embodiments of systems and methods in accordance with the invention is that once information security alerts are generated by monitoring devices on the network, a potential security threat that constitutes an attack on a computer asset in a computer network is immediately disrupted by adding the Internet Protocol (IP) address of the source that generated the threat to an access control list of an intermediate upstream gateway of the computer network for a period of time. During this period of time, the threat can be further analysed and a future mitigation enhanced action can be inferred and executed. This is to ensure that similar security threats are rapidly and effectively mitigated with less human intervention. Furthermore, the act of disrupting the potential security threat may in itself be the mitigation action to address the attack. By disrupting the transmission of data packets of the potential security threat, the system is in actual fact breaking down the attack before the attack is able to properly form at its intended target.

A second advantage of embodiments of systems and methods in accordance with the invention is that as a hybrid communication means may be utilized to transmit instructions to a gateway of the computer network, this ensures that appropriate instructions may be transmitted to the gateway even if conventional telecommunication networks are jammed or compromised.

A third advantage of embodiments of systems and methods in accordance with the invention is that the invention is able to handle multiple threats simultaneously as the system would automatically block ingress and egress network threats by adding the security threat's source IP address into access control lists of the intermediate upstream gateways thereby disrupting these threats immediately while allowing sufficient time for additional further mitigating actions to be executed, if necessary.

A fourth advantage of embodiments of systems and methods in accordance with the invention is that the invention is able to disrupt the intermediate gateway through which the information security threat passed regardless of the brand, type, version or model of this upstream gateway. A fifth advantage of embodiments of systems and methods in accordance with the invention is that a potential security threat that constitutes an attack on a computer asset in a computer network is immediately disrupted by adding the Internet Protocol (IP) address of the source that generated the threat to the access control lists of all gateways of the computer network that are located upstream of computer assets in the computer network for a period of time.

The above advantages are provided by embodiments of a system in accordance with the invention operating in the following manner. The system has a processing unit and a non-transitory media readable by the processing unit. The media is configured to store instructions that when executed by the processing unit, cause the processing unit to receive and to process a first alert and a second alert from a monitoring device on the network. The first alert and the second alert both include an Internet Protocol address of a source that initiated the information security attack on the computer network and an identity of the gateway through which the attack passed. The instructions when executed by the processing unit also directs the processing unit to determine if the Internet Protocol address of the source that initiated the information security attack on the computer network is to be disrupted and generate a first set of instructions and transmit the first set of instructions to the gateway through which the attack passed through. The first set of instructions instructs the gateway to add the IP addresses of the source of attack that initiated the information security attack to an access control list of the gateway.

The instructions when executed by the processing unit also directs the processing unit to generate a second set of instructions and to transmit the second set of instructions to the gateway of the computer network after a first period of time has lapsed, wherein the second set of instructions instructs the gateway to remove the IP address of the source that initiated the information security attack from the access control list of the gateway. Further, the instructions when executed by the processing unit also directs the processing unit to determine, during the first period of time, if a new mitigation action is to be created to address the first alert and the second alert based on a security alert database; and if a new mitigation action is to be created to address the first alert and the second alert, to transmit the first alert and the second alert to a command centre.

In accordance with embodiments of the invention, the instructions to transmit the first set of instructions to the gateway of the computer network comprises instructions for directing the processing unit to determine if the first set of instructions can be transmitted to the gateway of the computer network using a telecommunication network, and if it is determined that the first set of instructions cannot be transmitted using the telecommunication network, to transmit the first set of instructions to the gateway of the computer network using an out-of-band network.

In accordance with embodiments of the invention, the instructions to generate the first set of instructions comprises instructions for directing the processing unit to use the identity of the gateway to select an associated instruction set from a gateway database, and to compile the first set of instructions using the selected instruction set.

In accordance with embodiments of the invention, the instructions to transmit the second set of instructions to the gateway of the computer network comprises instructions for directing the processing unit to determine if the second set of instructions can be transmitted to the gateway of the computer network using a telecommunication network, and if it is determined that the second set of instructions cannot be transmitted using the telecommunication network, to transmit the second set of instructions to the gateway of the computer network using an out-of-band network.

In accordance with embodiments of the invention, the instructions to generate the second set of instructions comprises instructions for directing the processing unit to use the identity of the gateway to select an associated instruction set from a gateway database, and to compile the second set of instructions using the selected instruction set.

In accordance with further embodiments of the invention, the gateway comprises a network node on the computer network that is located upstream of the monitoring device. In accordance with yet another further embodiment of the invention, the gateway comprises a first network node on the computer network and a second network node on the computer network wherein the second network node is located upstream of the first network node, and the first network node is located upstream of the monitoring device. In accordance with still yet another further embodiment of the invention, the gateway comprises all network nodes on the computer network that are located upstream of the monitoring device.

In accordance with embodiments of the invention, the instructions to transmit the first alert and the second alert to the command centre comprises instructions for directing the processing unit to determine if the first alert and the second alert can be transmitted to the command centre directly using a telecommunication network, and if it is determined that the first alert and the second alert cannot be transmitted directly using the telecommunication network, to transmit the first alert and the second alert to the gateway of the computer network using an out-of-band network, wherein the first alert and second alert is then transmitted from the gateway to the command centre using the telecommunication network.

In accordance with embodiments of the invention, the instructions to determine if the Internet Protocol address of the source that initiated the information security attack on the computer network is to be disrupted comprises instructions for directing the processing unit to determine if the first alert correlates with the second alert; and if the first alert correlates with the second alert, to confirm that the Internet Protocol address of the source that initiated the information security attack is to be disrupted. In accordance with further embodiments of the invention, the media further includes instructions that when executed by the processing unit direct the processing unit to add the new mitigation action created by the command centre to address the first alert and the second alert into the security alert database.

In accordance with yet another embodiment of the invention, the system has a processing unit and a non-transitory media readable by the processing unit. The media is configured to store instructions that when executed by the processing unit, cause the processing unit to receive and process an alert from a monitoring device on the network, wherein the alert includes an Internet Protocol address of a source that initiated the information security attack on the computer network and an identity of a gateway through which the attack passed.

The instructions further cause the processing unit to generate a first set of instructions and to transmit the first set of instructions to the gateway through which the attack passed, wherein the first set of instructions instruct the gateway to add the IP address of the source that initiated the information security attack to an access control list of the gateway, and to transmit a second set of instructions to the gateway through which the attack passed after a first period of time has lapsed, wherein the second set of instructions instruct the gateway to remove the IP address of the source that initiated the information security attack from the access control list of the gateway. Further, the instructions when executed by the processing unit also directs the processing unit to determine, during the first period of time, if a new mitigation action is to be created to address the alert based on a security alert database, and if a new mitigation action is to be created to address the alert, transmitting the alert to a command centre.

BRIEF DESCRIPTION OF THE DRAWINGS

The above advantages and features in accordance with this invention are described in the following detailed description and are shown in the following drawings.

DETAILED DESCRIPTION

This invention relates to a system and method for disrupting an information security threat that constitutes an attack on a computer asset in a computer network, wherein this information security threat is disrupted after the attack on the computer asset has been detected by at least one of the monitoring devices on the affected computer network. An intermediate upstream gateway of the affected computer network is then utilized to disrupt this information security threat. The detected security threat is disrupted at the intermediate upstream gateway for a period of time by automatically blocking the Internet Protocol (IP) address of the source of the attack from transmitting further data to the computer network. After this period of time has lapsed, the IP address of the source will be automatically unblocked. As the detected attack is being disrupted, a mitigation action will be automatically initiated if a mitigation action associated with the attack is stored in the system's database; else information about the attack will be sent to a central command centre for further assessment. At the central command centre, a mitigating action will be further developed and executed to address the intention of the attack.

Figure 1:
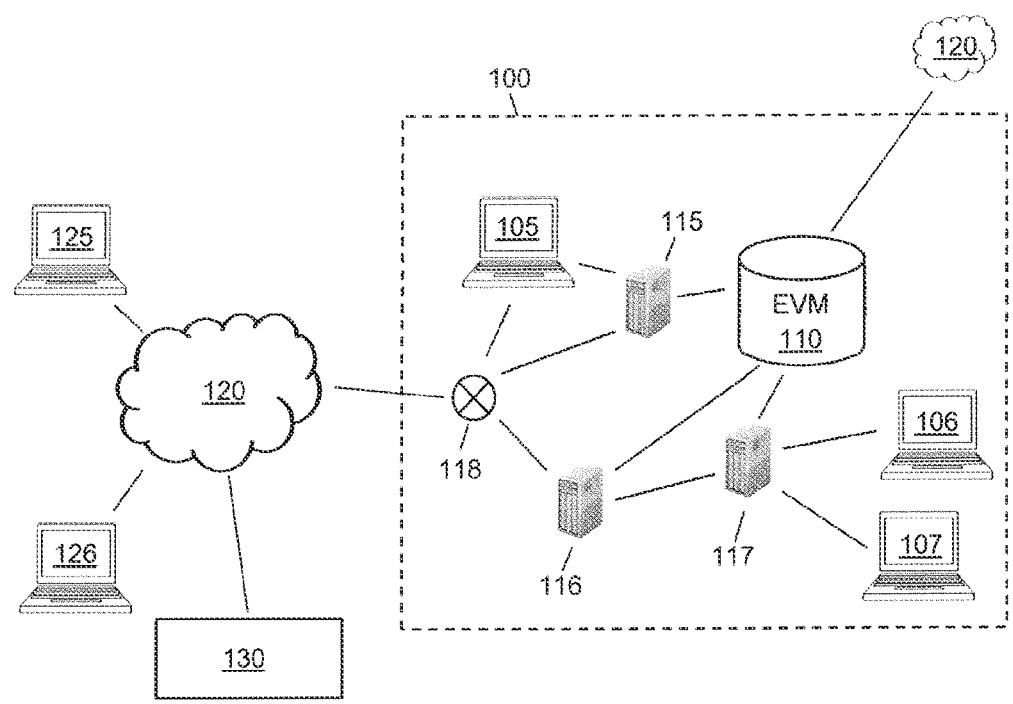
FIG. 1 illustrating a network diagram of components that make up a network security management system for disrupting an attack in accordance with an embodiment of the invention.

FIG. 1 illustrates network under management 100 that includes modules and devices that execute processes to provide a method and system for disrupting information security threats originating from computing devices 125, 126 that target computer assets within network 100 in accordance with embodiments of the invention. As illustrated in FIG. 1, network under management 100 includes computer assets such as computing devices 105, 106 and 107. Computing devices 105, 106, and 107 may include any type of computing device and may comprise, but are not limited to, smart phones, laptops, tablets, computers, servers, workstations, and so on. One skilled in the art will recognize that computing devices 105, 106, and 107 are only provided as an example and other types of devices with displays, processors, non-transitory media for storing instructions, alphanumeric input means and pointer manipulating means may be used without departing from this invention. Further, although FIG. 1 illustrates that only three computing devices are provided within the network 100, in actual fact, many more computing devices may be provided within the network 100 without departing from this invention.

As illustrated in FIG. 1, computing devices 105, 106 and 107 all connect to network 120 via intermediate upstream gateway 118. Computing devices 105, 106 and 107 communicatively connect to gateway 118 either via wired means, wireless means or a combination of both. Wired means may include a wired network such as a wide area network (WAN) or a local area network (LAN), while wireless means includes connections established via Radio Frequency (RF) signals, infrared signals, or any other means of wireless transmissions. Gateway 118 is a node on network 100 which serves as an access point from network 120 to network 100. In other words, gateway 118 provides an entry point for data traveling into network 100 from network 120 and conversely, provides an exit point for data traveling in the other direction, from network 100 to network 120. As such, in the embodiment illustrated in FIG. 1, if computing devices 125, 126 were to initiate an information security attack on computing devices that are located within network 100, these information security attacks would first have to first pass through gateway 118.

Gateway 118 may include any network node that is able to route internet traffic from any number of computing devices located behind the gateway to computing devices located on external networks. Such network nodes include, but are not limited to, devices that utilize border gateway protocols, DSL routers, cable routers, VLAN, bridges, switches, etc. As for network 120, network 120 is a communications network, such as the Internet, that allows computing devices and/or processing systems to communicate with one another either through wired means, wireless means or a combination of both. Although FIG. 1 only illustrates that network 100 comprises of only gateway 118, one skilled in the art will recognize that network 100 may have any number of gateways without departing from this invention.

Computing devices in network 100 may be indirectly or directly connected to gateway 118. FIG. 1 illustrates computing devices 106 and 107 that are indirectly connected to gateway 118 while computing device 105 is illustrated as being directly connected to gateway 118. It should be noted that computing devices 105, 106 and 107 are communicatively connected to their respective monitoring devices either via wired means, wireless means or a combination of both. As illustrated in FIG. 1, computing devices 106 and 107 reside behind both monitoring devices 117 and 116 and this means that any data transmitted to gateway 118 from computing devices 106, 107 will have to first pass through both monitoring devices 117 and 116. Similarly, any data transmitted from gateway 118 to computing devices 106, 107 will also have to pass through both monitoring devices 117 and 116 before the data is received by computing devices 106, 107. As such, any attempted information security attacks on either one of computing devices 106 or 107 may be easily detected by monitoring devices 116 and 117. Unlike computing devices 106, 107, as computing device 105 is directly connected to gateway 105, any information security attacks on computing device 105 may not be instantaneously detected by the system as all data transmission takes place directly between computing device 105 and gateway 118. To address this flaw, there will be a direct connection between computing device 105 and monitoring device 115 whereby monitoring device 115 will sporadically check the status of computing device 105 to ensure that computing device 105 has not been compromised by an information security attack.

Although FIG. 1 illustrates that only gateway 118 is located upstream of monitoring devices 115, 116, 117, any number of other gateways belonging to network 100 may be provided upstream of these monitoring devices without departing from this invention. For example, in yet another embodiment of the invention, gateway 118 may comprise of two network nodes. In particular, gateway 118 may comprise of a first network node and a second network node whereby the second network node is located upstream of the first network node, and the first network node is located upstream of monitoring devices 115, 116, 117. This means that data transmitted from network 120 towards computing devices 105, 106, 107 would have to first pass through the first network node, and the second network node before the data may be received by computing devices 105, 106, 107. One skilled in the art will recognize that gateway 118 is not limited to just two network nodes and may comprise of any number of network nodes belonging to network 100 that are located upstream of the monitoring devices in network 100. Further, from hereon, when reference is made in the description to a gateway, one skilled in the art will recognize that the referenced gateway may comprise of either a single network node or a plurality of network nodes without departing from this invention.

Monitoring devices 115, 116, 117 are network security devices that monitor a computer network's activities for malicious activities and may include any type of device or computer module that is able to identify malicious activity, log information about this activity, trigger and subsequently transmit an alert when such activity has been detected. Furthermore, when logging information about the detected malicious activity, these monitoring devices are also able to resolve, log and transmit the IP address of the source that is initiating the attack together with the IP address and identity of the network's gateway via which the attack passed through to access computing devices within network 100. Such network security devices may include, but are not limited to, hardware or software firewalls, antivirus software programs installed within computer modules, intrusion detection systems and/or intrusion prevention systems. The attacks that may be detected by these network security devices include, but are not limited to, TCP and UDP attacks or strings of malformed emails targeted at exploiting administrator access, the propagation of an unknown variant of a computer virus, rejected login requests and/or various types of login violations. In accordance with embodiments of the invention, monitoring devices 115, 116 and 117 may comprise of one network security device, or two network security devices or any number of security devices without departing from this invention. For example, in the illustration shown in FIG. 1, monitoring device 116 may comprise of two network security devices, that is a firewall and an intrusion detection and prevention system or in accordance with another embodiment of the invention, monitoring device 116 may comprise of one network security device, which is a firewall while monitoring device 117 may comprise of another network security device as well, which is an intrusion detection and prevention system. One skilled in the art will recognize that various configurations of computing devices and monitoring devices may be used without departing from this invention and are not limited only to the configurations shown in FIG. 1.

Monitoring devices 115, 116 and 117 are all communicatively connected to event manager 110 either via wired means, wireless means or a combination of both. Event manager 110 includes various computer modules for carrying out various functions such as, but not limited to, a computing module for receiving and processing alerts from monitoring devices, a computing module for storing received alerts in a database provided within event manager 110, a computing module for transmitting a received alert to a global command centre using a telecommunications network, a computing module for communicating with a gateway via an out-of-band network, and a transceiver module for receiving/transmitting data from/to the Internet. In addition to the above, event manager 110 may also include a computing module for determining the IP address or identity of the gateway through which an information security network attack entered network 100. This computing module may also obtain from the IP address or identity of the gateway the operating parameters of this gateway such as the brand, model and/or version of the gateway. This is so that once event manager 110 has ascertained the IP address and/or identity of the gateway and subsequently the operating parameters of the network's gateway, by comparing this information with data stored within a database about various types of gateways available, event manager 110 will then be able to select from the database an appropriate instruction set associated with the identified network's gateway. The selected instruction set will then be used to compile instructions that are to be sent to the gateway.

Event manager 110 may be communicatively connected to gateway 118 via a telecommunications network or via an out-of-band network. If data is to be transmitted from event manager 110 to gateway 118 via a telecommunications network, event manager 110 will first transmit this data to network 120 either via wired means, wireless means or a combination of both. The data will then be transmitted from network 120 to gateway 118 via a telecommunication interface on gateway 118. Telecommunication networks that may be utilized to transmit data between event manager 110 and gateway 118 may include, but are not limited to, a TCP/IP data network or an optical transport network. In the event the telecommunication interface of gateway 118 is disrupted or blocked, an out-of-band network may be utilized to transmit data from event manager 110 to gateway 118. When an out-of-band network is utilized, data will initially be transmitted from event manager 110 to gateway 118 via internet 120 using Secure Shell (SSH), Secure Sockets Layer (SSL), Telnet and RS-232 protocols. The data will then be transmitted from network 120 to an out-of-band interface provided at gateway 118. The out-of-band interface is usually built into gateway 118 and may be used to receive instructions to configure an access control list of gateway 118. In accordance with an embodiment of the invention, the out-of-band interface at gateway 118 may comprise standard RS-232 serial ports. The RS-232 serial port at gateway 118 may be used to receive instructions to change root parameters within gateway 118, as well as receive instructions to modify other administrative and reporting functions, such as the gateway's access control list.

When a new information security attack is detected, a new mitigation action has to be developed and executed to address this new threat. The development of the new mitigation action typically takes place at global command centre 130. Global command centre 130 may be a secure data centre that has consultants or analysts for analysing information security attacks and threats. In the embodiment illustrated in FIG. 1, global command centre 130 may receive alerts or various other transmissions from event manager 110 via network 120. Upon receiving these alerts, personnel at global command centre 130 will then analyse and develop appropriate mitigation actions to address these alerts. The appropriate mitigation actions may then be transmitted to event manager 110 using network 120.

Figure 2:
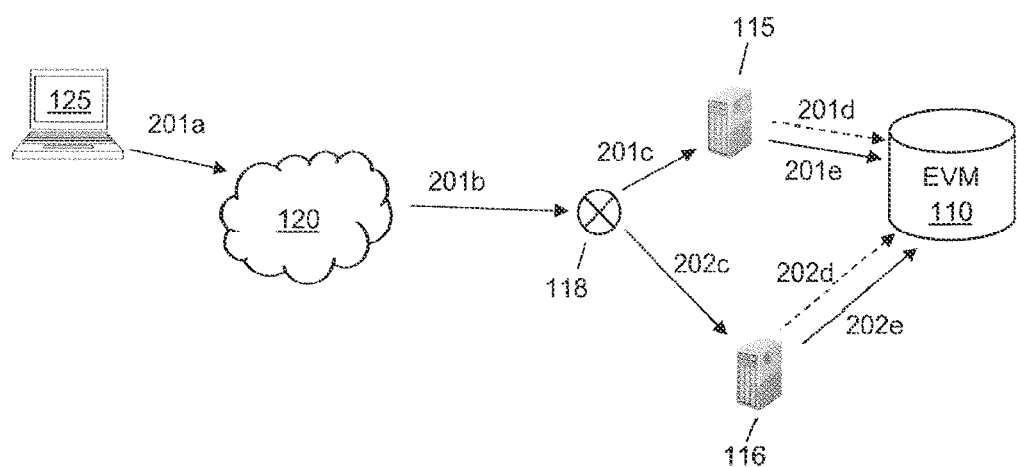
FIG. 2 illustrating a timing diagram of an attack on a computer network that is being managed by a security management system in accordance with an embodiment of the invention.

FIG. 2 illustrates a timing diagram of an information security threat on the computer network of system 100 as initiated by untrusted computing device 125 in accordance with an embodiment of the invention. As previously illustrated in FIG. 1, computing device 125 is an untrusted device that is initiating information security threats targeting computing devices 105, 106, 107 on network 100 through gateway 118. In particular, at step 201*a*, untrusted computing device 125 transmits an information security network attack targeting computing device 105. The network attack from computing device 125 passes through gateway 118 at step 201*b* and is detected by a first monitoring module, network security device or mechanism within monitoring device 115 at step 201*c*. Immediately, upon detecting the network attack from computing device 125, the first network security device within monitoring device 115 will transmit a first alert to event manager 110. This takes place at step 201*d*. If monitoring device 115 is provided with a second monitoring mechanism, network security device or module, a second alert will also be sent to event manager 110 once the second network security device detects the similar attack. This occurs at step 201*e*. In accordance with embodiments of the invention, the first network security device within monitoring device 115 may be a firewall and the second network security device within monitoring device 115 may be an intrusion detection system or vice versa.

In addition to alerting event manager 110 about the network attack, monitoring device 115 will also resolve the IP address of the source of the network attack and will also obtain the identity and IP address of the gateway through which the attack passed through. All this information will then be provided together with the alert that is transmitted to event manager 110.

Similarly, a network attack from computing device 125 that targets computing devices 106, 107 will pass through gateway 118 at step 201*b* and will be detected by a first monitoring module, network security device or mechanism within monitoring device 116 at step 202*c*. Immediately, upon detecting the network attack from computing device 125, the first network security device within monitoring device 116 will transmit a first alert to event manager 110. This takes place at step 202*d*. In the event that monitoring device 116 is also provided with a second monitoring mechanism, network security device or module, a second alert will be triggered and sent to event manager 110 once the second network security device detects the above mentioned attack. This occurs at step 202*e*.

Figure 3:
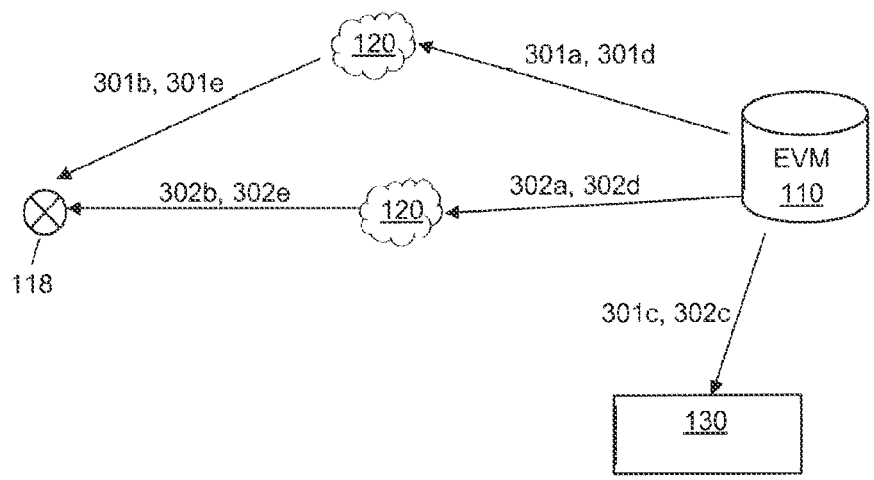
FIG. 3 illustrating a timing diagram of an attack on a computer network that is being disrupted by a security management system in accordance with embodiments of the invention.

With reference to FIG. 3, after event manager 110 has received the first alert from monitoring device 115; event manager 110 will analyse and process the information contained within the first alert to obtain the identity of the gateway through which the information security network attack entered network 100. Using this identity, event manager 110 will then determine the operating parameters of the gateway, which in this example is gateway 118, such as the brand, model and/or version of the gateway. This is so that once event manager 110 has ascertained the brand, model and/or version of the gateway, based on information stored within a database about various types of gateways available, event manager 110 will then be able to select from the database an appropriate instruction set associated with the identified gateway.

After event manager 110 has selected an instruction set associated with the identified gateway, event manager 110 will use the selected instruction set to compile a set of instructions to instruct the gateway to add the IP address of the source that initiated the information security attack to an access control list of the gateway. If the instructions are transmitted using a telecommunications network, this set of instructions will first be compiled using standard telecommunication protocols and transmitted to network 120 at step 301*a* and then subsequently transmitted to gateway 118 at step 301*b*. A telecommunication interface at gateway 118 will receive the instructions and add the IP address of the source that initiated the information security attack to an access control list of gateway 118 thereby effectively blocking all data transmissions from the source of the attack to network 100.

After step 301*b*, event manager 110 will determine whether a new mitigation action is to be created for the alert that was received from monitoring device 115. Event manager 110 does this by trying to find a match between the received alert with a list of alerts stored within a security alert database. If event manager 110 is able to find a match from the list of stored alerts, a mitigating action associated with the stored alert will be retrieved and will be carried out by event manager 110. Alternatively, if event manager 110 is unable to match the received alert with a stored alert in the security alert database, the alert will then be transmitted from event manager 110 to global command centre 130 at step 301*c*. At global command centre 130, computer analysts and consultants will analyse the received alert and will create a mitigating action to address the network attack. The mitigating action will then be executed by global command centre 130 accordingly. After the attack has been repelled, the mitigating action that was executed to address the attack will be added into the security alert database at event manager 110 along with details of the associated network attack. This is so that if such information security attacks occur in the future, the corresponding mitigating action may be retrieved from the security alert database thereby negating the need to communicate with global command centre 130.

After a first period of time has lapsed, event manager 110 will use the previously selected instruction set to compile a set of instructions to instruct the gateway to remove the IP address of the source that initiated the information security attack from the access control list of the gateway. As the instructions were previously transmitted using a telecommunications network, this set of instructions will similarly be compiled using standard telecommunication protocols and then be transmitted to network 120 at step 301d and subsequently transmitted to gateway 118 at step 301e. The telecommunication interface at gateway 118 will similarly receive the instructions and remove the IP address of the source that initiated the information security attack from the access control list of gateway 118 thereby effectively unblocking all data transmissions from the source of the attack to network 100. In accordance with embodiments of the invention, the first period of time may be any period of time ranging from 1 minute to 60 minutes.

In accordance with another embodiment of the invention, if event manager 110 determines that the telecommunications network is jammed, disrupted and may not be used, event manager 110 will transmit the instructions using an out-of-band network. An appropriate out-of-band protocol will first be used to compile the set of instructions. The set of instructions will then be transmitted to network 120 at step 302a and then subsequently transmitted to gateway 118 at step 302b. An out-of-band interface at gateway 118 will receive the instructions and add the IP address of the source that initiated the information security attack to an access control list of gateway 118 thereby effectively blocking all data transmissions from the source of the attack to network 100. Similarly as discussed above, after step 302b, event manager 110 will determine whether a new mitigation action is to be created for the alert that was received from monitoring device 115. If a new mitigation action is to be created, the alert will then be transmitted from event manager 110 to global command centre 130 at step 302c whereby a mitigation action to address the network attack will be developed and executed. Alternatively, if a new mitigation action does not need to be created, the previously created mitigation action will be executed by event manager 110 automatically.

After a first period of time has lapsed, event manager 110 will use the previously selected instruction set to compile a set of instructions to instruct the gateway to remove the IP address of the source that initiated the information security attack from the access control list of the gateway. As the instructions were previously transmitted using the out-of-band network, the appropriate out-of-band protocol will similarly be used to compile this set of instructions. The set of instructions will then be transmitted to network 120 at step 302d and then subsequently transmitted to gateway 118 at step 302e. An out-of-band interface at gateway 118 will receive the new instructions and remove the IP address of the source that initiated the information security attack from the access control list of gateway 118 thereby unblocking all data transmissions from the source of the attack to network 100.

In accordance with another embodiment of the invention, before step 301a takes place, which is before event manager 110 generates a set of instructions to instruct the gateway to add the IP address of the source that initiated the information security attack to the access control list of the gateway, event manager 110 will first determine if the first alert has been correlated with a second alert. In other words, event manager 110 will determine whether the first alert issued by monitoring device 115 is in relation to a real attack or a false alarm by comparing details of the first alert with details of a second alert. One skilled in the art will recognize that the first and second alerts may be issued by a single monitoring device, e.g. monitoring device 115, or may be issued by two separate monitoring devices, e.g. a first alert that is issued by monitoring device 115 and a second alert that is issued by monitoring device 116. If event manager 110 correlates the first and second alerts, this indicates that the attack is a real attack and not a false alarm and as such, the IP address of the source of the attack should be disrupted from transmitting further data to network 100.

For example, with reference to FIGS. 2 and 3, after event manager 110 receives a first alert from monitoring device 115 at step 201d and a second alert from monitoring device 115 at step 201e; event manager 110 compares these two alerts to determine whether these two alerts are similar. If the two alerts are similar, this indicates to event manager 110 that the attack detected by the two modules within monitoring device 115 is a real attack and that the attack should be disrupted. Event manager 110 then caries out steps 301a-301e or 302a-302e as discussed above.

In order to provide such a system or method, a process is needed for disrupting information security threats or attacks on a computer network using the network's gateway. The following description and FIGS. 4-6 describe embodiments of processes that provide such a disruption process in accordance with this invention.

Figure 4:
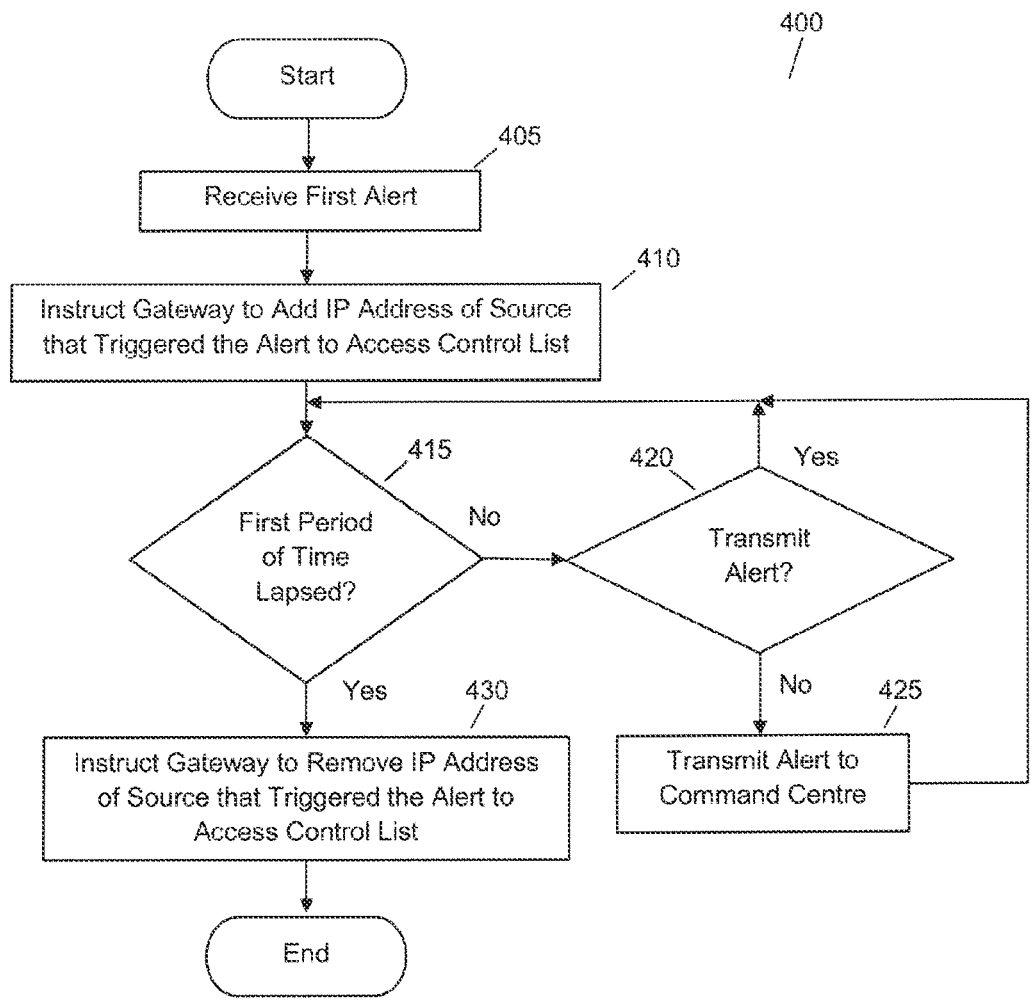
FIG. 4 illustrating a flow diagram of a process for disrupting an attack on a computer network in accordance with embodiments of the invention.

FIG. 4 illustrates process 400 that is performed by a computer system in a computing device for disrupting an information security attack on a computer network in accordance with embodiments of the invention. Process 400 begins in step 405 by receiving an alert from a first monitoring device. In accordance with embodiments of the invention, the first monitoring device will typically trigger an alert upon detection of an information security threat or a network anomaly. An IP address of the source of the network attack and the identity and IP address of the gateway through which the attack passed through will be captured by the first monitoring device and be included together with the alert.

In embodiments of the invention, once process 400 receives the alert, process 400 will analyse the information contained within the first alert to determine the operating parameters of the gateway through which the information security network attack entered the network, such as the brand, model and/or version of the gateway. This is so that once process 400 has ascertained the brand, model and/or version of the gateway, based on information stored within a database about various types of gateways available, process 400 will then be able to select from the database an appropriate instruction set associated with the identified gateway.

After process 400 has selected an instruction set associated with the identified gateway, process 400 will use the selected instruction set to compile a set of instructions to instruct the identified gateway to add the IP address of the source that initiated the information security attack to an access control list of the gateway. This instruction set is then transmitted to the identified gateway. This takes place at step 410.

At step 415, process 400 determines whether a first period of time has lapsed. If the first period of time has not lapsed, process 400 will then proceed to step 420. At step 420, process 400 determines whether the received alert is to be transmitted to a command centre. If the alert is to be transmitted to the command centre, process 400 progresses to step 425. Process 400 then proceeds to transmit the alert to the command centre at step 425 and once this is done, process 400 proceeds to step 415.

Back at step 415, process 400 determines whether the first period of time has lapsed and if not, process 400 progresses to step 420. As the alert no longer needs to be transmitted, process 400 now progresses to step 415 and steps 415-420 repeats until the first period of time has passed.

After the first period of time has lapsed, process 400 proceeds to step 430. At this step, process 400 will use the previously selected instruction set to compile a set of instructions to instruct the identified gateway to remove the IP address of the source that initiated the information security attack from the access control list of the gateway. This instruction set is then transmitted to the identified gateway. Process 400 then ends.

Figure 5:
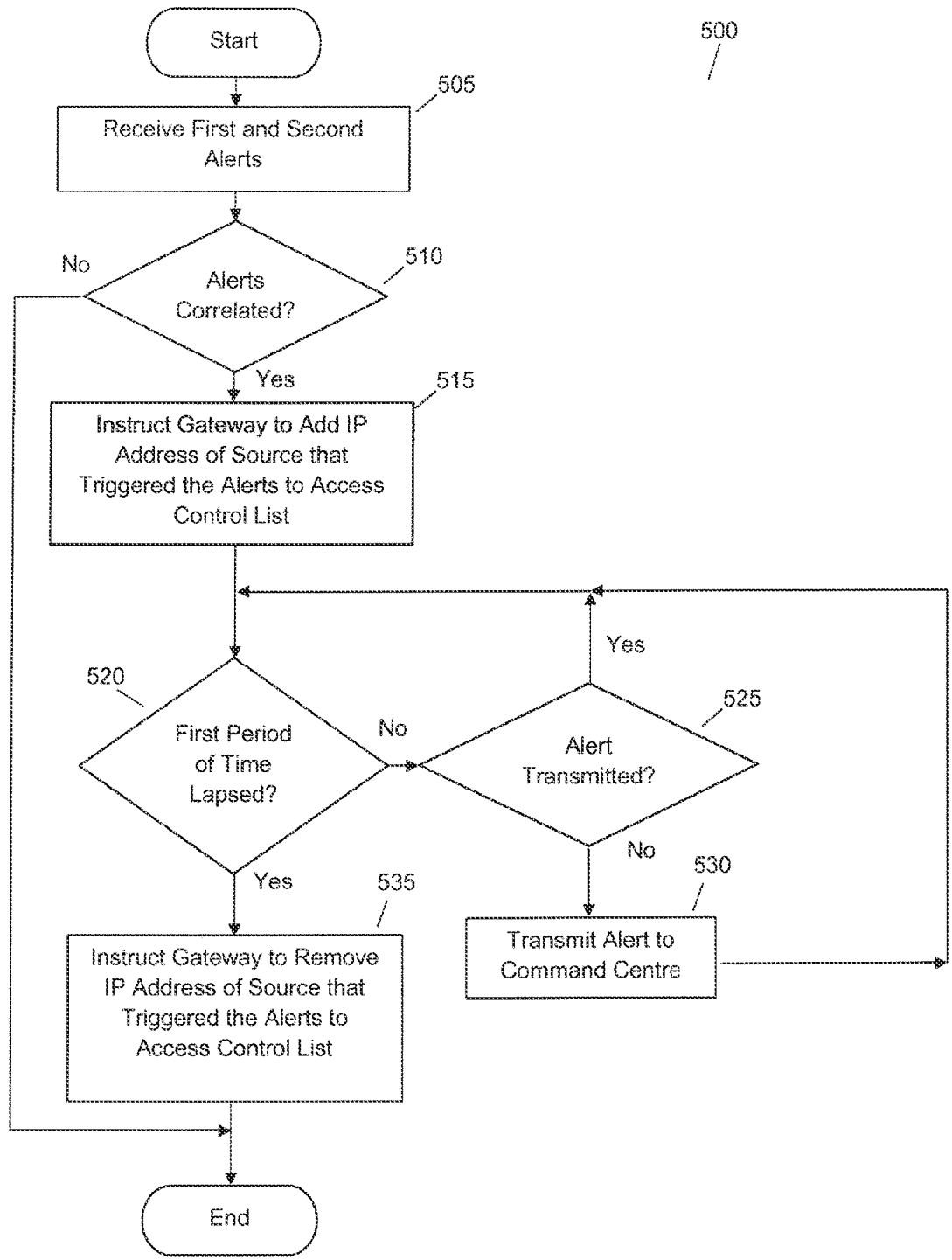
FIG. 5 illustrating a flow diagram of another process for disrupting an attack on a computer network in accordance with embodiments of the invention.

In accordance with yet another embodiment of the invention, a process performed by a computer system in a computing device for disrupting an information security attack on a computer network is illustrated in FIG. 5. Process 500 begins in step 505 by receiving a first alert and a second alert from a monitoring device. As previously mentioned, a first alert will typically be triggered by a first module within the monitoring device upon detection of a network attack or a network anomaly and a second alert will usually be triggered by a second module within the monitoring device upon detection of a network attack as well. An IP address of the source of the network attack and the identity and IP address of the gateway through which the attack passed through will be included together with the first and second alerts.

Process 500 will then determine at step 510 whether the IP address of the source that triggered the first and second alerts is to be blocked or whether the alerts are false alarms. If process 500 determines that the alerts are correlated, process 500 will determine that the alerts are related to a real attack and process 500 will proceed to step 515. Else, if the alerts do not correlate, process 500 will end.

At step 515, once process 500 has determined that the alert are related to a real attack, process 500 will analyse the information contained within the first and second alerts to determine the operating parameters of the gateway through which the information security network attack entered the network, such as the brand, model and/or version of the gateway. This is so that once process 500 has ascertained the brand, model and/or version of the gateway, based on information stored within a database about various types of gateways available, process 500 will then be able to select from the database an appropriate instruction set associated with the identified gateway.

After process 500 has selected an instruction set associated with the identified gateway, process 500 will use the selected instruction set to compile a set of instructions to instruct the identified gateway to add the IP address of the source that initiated the information security attack to an access control list of the gateway. This instruction set is then transmitted to the identified gateway. This all still takes place at step 515.

At step 520, process 500 determines whether a first period of time has lapsed. If the first period of time has not lapsed, process 500 will then proceed to step 525. At step 525, process 500 determines whether the received alert is to be transmitted to a command centre. If the alert is to be transmitted to the command centre, process 500 progresses to step 530. Process 500 then proceeds to transmit the alert to the command centre at step 530 and once this is done, process 500 proceeds to step 520.

Back at step 520, process 500 determines whether the first period of time has lapsed and if not, process 500 progresses to step 525. As the alert no longer needs to be transmitted, process 500 now progresses to step 520 and steps 520-525 repeats until the first period of time has passed.

After the first period of time has lapsed, process 500 proceeds to step 535. At this step, process 500 will use the previously selected instruction set to compile a set of instructions to instruct the identified gateway to remove the IP address of the source that initiated the information security attack from the access control list of the gateway. This instruction set is then transmitted to the identified gateway. Process 500 then ends.

Figure 6:
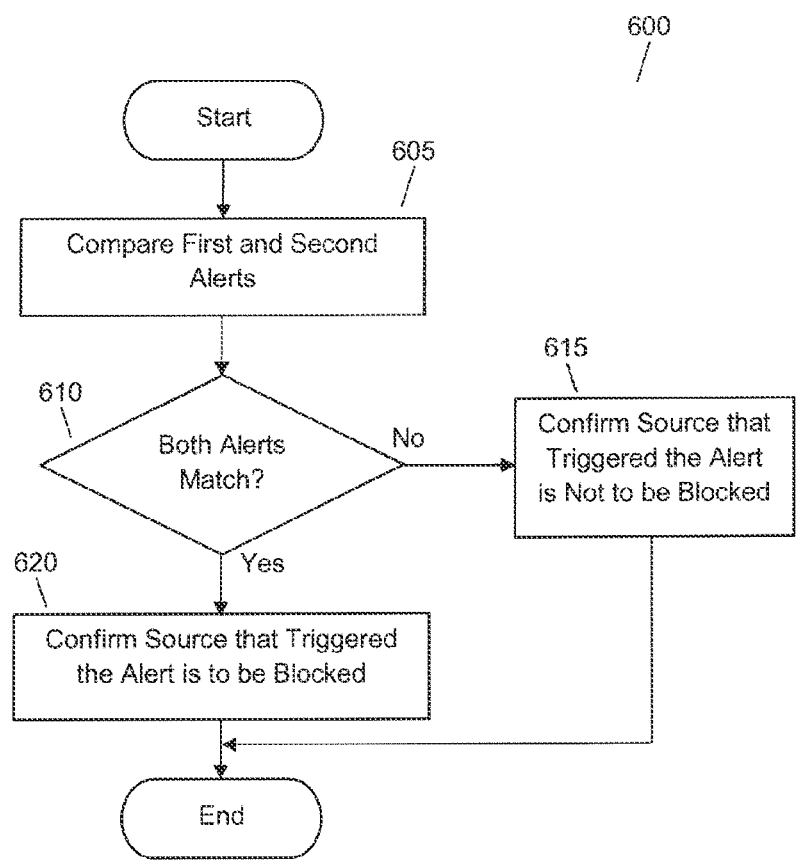
FIG. 6 illustrating a flow diagram of a process for determining if an information security threat is to be disrupted in accordance with embodiments of the invention.

FIG. 6 illustrates process 600 that is performed by a computer system in a computing device for determining if the data transmission from the IP address of the source that triggered the alert at the first monitoring device is to be disrupted in accordance with embodiments of the invention. Process 600 begins at step 605 by comparing details about the attack as contained within the first and second alerts. At step 610 if process 600 determines that both alerts are identical, process 600 progresses to step 620. At step 620, process 600 then issues a confirmation that the source that triggered the alert at the monitoring device is indeed an information security network attack or threat and as such, should be disrupted by the system. Process 600 then ends.

Returning to step 610, if process 600 determines that the first alert does not match with the second alert, process 600 will then proceed to step 615. At step 615, process 600 then issues a confirmation that the attack is a false alarm and as such, the IP address of the source that triggered the attack is not to be disrupted by the system. Process 600 then ends.

Figure 7:
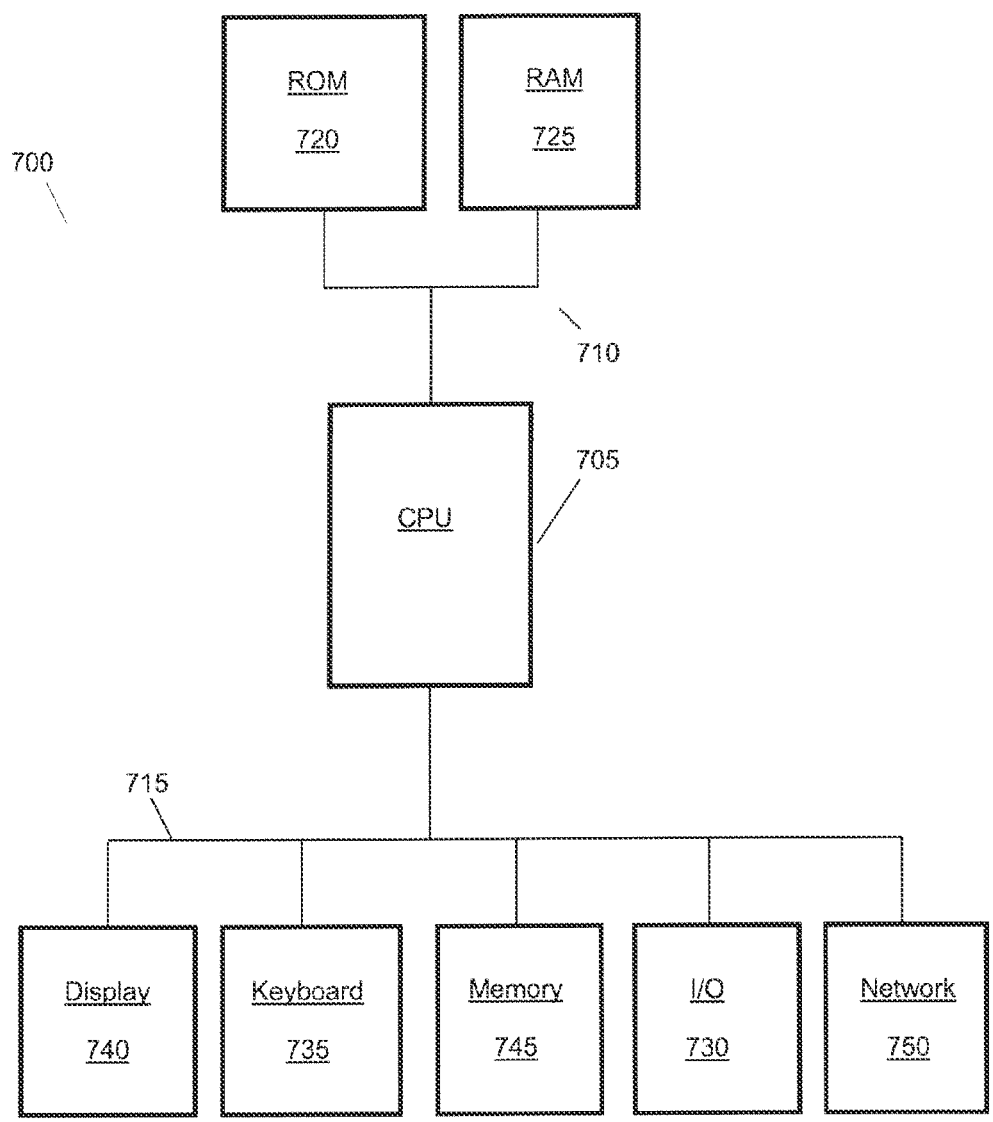
FIG. 7 illustrating a block diagram representative of processing systems providing embodiments in accordance with embodiments of the invention.

Processes provided by instructions stored in a non-transitory media are executed by a processing unit in a computer system. For the avoidance of doubt, non-transitory computer-readable media shall be taken to comprise all computer-readable media except for a transitory, propagating signal. A computer system may be provided in one or more computing devices and/or computer servers to provide this invention. The instructions may be stored as firmware, hardware, or software. FIG. 7 illustrates an example of such a processing system. Processing system 700 may be the processing system in the mobile devices and/or servers that execute the instructions to perform the processes for providing a method and/or system in accordance with embodiments of this invention. One skilled in the art will recognize that the exact configuration of each processing system may be different and the exact configuration of the processing system in each mobile device may vary and FIG. 7 is given by way of example only.

Processing system 700 includes Central Processing Unit (CPU) 705. CPU 705 is a processor, microprocessor, or any combination of processors and microprocessors that execute instructions to perform the processes in accordance with the present invention. CPU 705 connects to memory bus 710 and Input/Output (I/O) bus 715. Memory bus 710 connects CPU 705 to memories 720 and 725 to transmit data and instructions between memories 720, 725 and CPU 705. I/O bus 715 connects CPU 705 to peripheral devices to transmit data between CPU 705 and the peripheral devices. One skilled in the art will recognize that I/O bus 715 and memory bus 710 may be combined into one bus or subdivided into many other busses and the exact configuration is left to those skilled in the art.

A non-volatile memory 720, such as a Read Only Memory (ROM), is connected to memory bus 710. Non-volatile memory 720 stores instructions and data needed to operate various sub-systems of processing system 700 and to boot the system at start-up. One skilled in the art will recognize that any number of types of memory may be used to perform this function.

A volatile memory 725, such as Random Access Memory (RAM), is also connected to memory bus 710. Volatile memory 725 stores the instructions and data needed by CPU 705 to perform software instructions for processes such as the processes required for providing a system in accordance with embodiments of this invention. One skilled in the art will recognize that any number of types of memory may be used as volatile memory and the exact type used is left as a design choice to those skilled in the art.

I/O device 730, keyboard 735, display 740, memory 745, network device 750 and any number of other peripheral devices connect to I/O bus 715 to exchange data with CPU 705 for use in applications being executed by CPU 705. I/O device 730 is any device that transmits and/or receives data from CPU 705. Keyboard 735 is a specific type of I/O that receives user input and transmits the input to CPU 705. Display 740 receives display data from CPU 705 and display images on a screen for a user to see. Memory 745 is a device that transmits and receives data to and from CPU 705 for storing data to a media. Network device 750 connects CPU 705 to a network for transmission of data to and from other processing systems.

The above is a description of embodiments of a system and process in accordance with the present invention as set forth in the following claims. It is envisioned that others may and will design alternatives that fall within the scope of the following claims.

The invention claimed is:

1. A method for disrupting an information security attack on at least one computing device of a plurality of computing devices in a managed computer network, the method comprising:

receiving using an event manager system, a first alert and a second alert from at least one monitoring device of a plurality of monitoring devices in the managed computer network and connected to the plurality of computing devices, wherein the event manager system is linked to the plurality of computing devices via a communicative connection of the event manager system and the plurality of monitoring devices, wherein each of the plurality of computing devices has its network activity monitored by at least one of the plurality of monitoring devices for an information security attack and each of the plurality of computing devices is located downstream of at least one of the plurality of monitoring devices, wherein the event manager system is within the managed computer network;

the at least one monitoring device generating the first alert in response to a first detection by a first network security device within the at least one monitoring device of an information security attack and generating the second alert in response to a second detection by a second network security device within the at least one monitoring device of an information security attack, and wherein the first alert and the second alert both include an Internet Protocol address of a source that initiated the detected information security attack on the at least one computing device and an identity of an intermediate upstream gateway of the managed computer network through which the attack passed, whereby the attack on the at least one computing device passed through the intermediate upstream gateway and at least one other gateway in the managed computer network and wherein the intermediate upstream gateway comprises a network node on the managed computer network that is located upstream of each of the plurality of monitoring devices and the at least one other gateway in the managed computer network;

determining by the event manager system operating parameters of the intermediate upstream gateway based on the identity of the intermediate upstream gateway through which the attack passed included in the first alert and the second alert by comparing the identity against a gateway database;

determining if the Internet Protocol address of the source that initiated the information security attack on the at least one computing device is to be disrupted using the event manager system based on the first and second alerts received from the at least one monitoring device, wherein the event manager system compares the first alert and the second alert to determine whether the two alerts are similar, whereby determining that the two alerts are similar indicates that the information security attack of the first detection and the information security attack of the second detection are the same information security attack which is a real attack and the Internet Protocol address of the source that initiated the information security attack on the at least one computing device is therefore to be disrupted;

if the Internet Protocol address of the source that initiated the information security attack on the at least one computing device is to be disrupted, generating a first set of instructions based on the operating parameters using the event manager system and transmitting via a network outside the managed computer network, the first set of instructions from the event manager system only to the intermediate upstream gateway, wherein the first set of instructions only instruct the intermediate upstream gateway to add the IP address of the source that initiated the information security attack to an access control list of the intermediate upstream gateway;

generating a second set of instructions based on the operating parameters using the event manager system and transmitting via a network outside the managed computer network, the second set of instructions from the event manager system to only the intermediate upstream gateway after a first period of time has lapsed, wherein the second set of instructions only instruct the intermediate upstream gateway to remove the IP address of the source that initiated the information security attack from the access control list of the intermediate upstream gateway;

determining, during the first period of time, if a new mitigation action is to be created to address the first alert and the second alert based on a security alert database using the event manager system; and if the new mitigation action is to be created to address the first alert and the second alert, transmitting the first alert and the second alert from the event manager system to a command center which resides outside the managed computer network.

2. The method of claim 1 wherein the transmitting via a network outside the managed computer network of the first set of instructions from the event manager system to the intermediate upstream gateway of the computer network comprises:

determining if the first set of instructions can be transmitted to the intermediate upstream gateway of the managed computer network via a telecommunication network using the event manager system; and if it is determined that the first set of instructions cannot be transmitted using the telecommunication network, transmitting the first set of instructions from the event manager system to the intermediate upstream gateway of the managed computer network using an out-of-band network.

3. The method of claim 1 wherein the generating of the first set of instructions comprises:

using the identity of the intermediate upstream gateway to select an associated instruction set from an intermediate upstream gateway brand and model database in the event manager system; and compiling the first set of instructions using the selected instruction set using the event manager system.

4. The method of claim 1 wherein the transmitting via a network outside the managed computer network of the second set of instructions from the event manager system to the intermediate upstream gateway of the managed computer network comprises:

determining if the second set of instructions can be transmitted to the intermediate upstream gateway of the managed computer network via a telecommunication network using the event manager system; and if it is determined that the second set of instructions cannot be transmitted via the telecommunication network, transmitting the second set of instructions from the event manager system to the intermediate upstream gateway of the managed computer network via an out-of-band network.

5. The method of claim 1 wherein the generating of the second set of instructions by the event manager system comprises:

using the identity of the intermediate upstream gateway to select an associated instruction set from an intermediate upstream gateway brand and model database using the event manager system; and compiling the second set of instructions using the selected instruction set using the event manager system.

6. The method of claim 1 wherein the transmitting the first alert and the second alert from the event manager system to the command center comprises:

determining if the first alert and the second alert can be transmitted to the command center directly using a telecommunication network; and if it is determined that the first alert and the second alert cannot be transmitted directly using the telecommunication network, transmitting the first alert and the second alert from the event manager system to the intermediate upstream gateway of the managed computer network using an out-of-band network, wherein the first alert and second alert is then transmitted from the intermediate upstream gateway to the command center using the telecommunication network.

7. A system for disrupting an information security attack on at least one computing device of a plurality of computing devices in a managed computer network comprising:

an event manager system including: a processing unit; and
 a non-transitory media readable by the processing unit, the media storing instructions that when executed by the processing unit, cause the processing unit to:

receive a first alert and a second alert from at least one monitoring device of a plurality of monitoring devices in the managed computer network and connected to the plurality of computing devices, wherein the event manager system is linked to the plurality of computing devices via a communicative connection of the event manager system and the plurality of monitoring devices, wherein each of the plurality of computing devices has its network activity monitored by at least one of the plurality of monitoring devices for an information security attack and each of the plurality of computing devices is located downstream of at least one of the plurality of monitoring devices, wherein the event manager system is within the managed computer network;

the at least one monitoring device generating the first alert in response to a first detection by a first network security device within the at least one monitoring device of an information security attack and generating the second alert in response to a second detection by a second network security device within the at least one monitoring device of an information security attack, and wherein the first alert and the second alert both include an Internet Protocol address of a source that initiated the detected information security attack on the at least one computing device and an identity of an intermediate upstream gateway of the managed computer network through which the attack passed, whereby the attack on the at least one computing device passed through the intermediate upstream gateway and at least one other gateway in the managed computer network and wherein the intermediate upstream gateway comprises a network node on the managed computer network that is located upstream of each of the plurality of monitoring devices and the at least one other gateway in the managed computer network;

determine operating parameters of the intermediate upstream gateway based on the identity of the intermediate upstream gateway through which the attack passed included in the first alert and the second alert by comparing the identity against a gateway database;

determine, using the first and second alerts, if the Internet Protocol address of the source that initiated the information security attack on the at least one computing device is to be disrupted, wherein the event manager system compares the first alert and the second alert to determine whether the two alerts are similar, whereby determining that the two alerts are similar indicates that the information security attack of the first detection and the information security attack of the second detection are the same information security attack which is a real attack and the Internet Protocol address of the source that initiated the information security attack on the at least one computing device is therefore to be disrupted;

if the Internet Protocol address of the source that initiated the information security attack on the at least one computing device is to be disrupted, to generate a first set of instructions based on the operating parameters and to transmit the first set of instructions via a network outside the managed computer network, to only the intermediate upstream gateway, wherein the first set of instructions only instruct the intermediate upstream gateway to add the IP address of the source that initiated the information security attack to an access control list of the intermediate upstream gateway;

generate a second set of instructions based on the operating parameters and to transmit via a network outside the managed computer network, the second set of instructions to only the intermediate upstream gateway after a first period of time has lapsed, wherein the second set of instructions only instruct the intermediate upstream gateway to remove the IP address of the source that initiated the information security attack from the access control list of the intermediate upstream gateway;

determine, during the first period of time, if a new mitigation action is to be created to address the first alert and the second alert based on a security alert database; and if the new mitigation action is to be created to address the first alert and the second alert, to transmit the first alert and the second alert to a command center which resides outside the managed computer network.

8. The system of claim 7 wherein the instruction to transmit via a network outside the managed computer network the first set of instructions to the intermediate upstream gateway of the managed computer network comprises:

instructions for directing the processing unit to:
determine if the first set of instructions can be transmitted to the intermediate upstream gateway of the managed computer network using a telecommunication network; and if it is determined that the first set of instructions cannot be transmitted using the telecommunication network, to transmit the first set of instructions to the intermediate upstream gateway of the managed computer network using an out-of-band network.

9. The system of claim 7 wherein the instructions to generate the first set of instructions comprises:

instructions for directing the processing unit to:
use the identity of the intermediate upstream gateway to select an associated instruction set from an intermediate upstream gateway brand and model database; and compile the first set of instructions using the selected instruction set.

10. The system of claim 7 wherein the instructions to transmit via a network outside the managed computer network the second set of instructions to the intermediate upstream gateway of the managed computer network comprises:

instructions for directing the processing unit to:
determine if the second set of instructions can be transmitted to the intermediate upstream gateway of the managed computer network using a telecommunication network; and if it is determined that the second set of instructions cannot be transmitted using the telecommunication network, to transmit the second set of instructions to the intermediate upstream gateway of the managed computer network using an out-of-band network.

11. The system of claim 7 wherein the instructions to generate the second set of instructions comprises:

instructions for directing the processing unit to:
use the identity of the intermediate upstream gateway to select an associated instruction set from an intermediate upstream gateway brand and model database; and compile the second set of instructions using the selected instruction set.

12. The system of claim 7 wherein the instructions to transmit the first alert and the second alert to the command center comprises:

instructions for directing the processing unit to:
determine if the first alert and the second alert can be transmitted to the command center directly using a telecommunication network; and if it is determined that the first alert and the second alert cannot be transmitted directly using the telecommunication network, to transmit the first alert and the second alert to the intermediate upstream gateway of the managed computer network using an out-of-band network, wherein the first alert and second alert is then transmitted from the intermediate upstream gateway to the command center using the telecommunication network.

13. An event manager system in a computer network system for disrupting an information security attack on at least one computing device of a plurality of computing devices in a managed computer network comprising:

circuitry configured to receive a first alert and a second alert from at least one monitoring device of a plurality of monitoring devices in the managed computer network and connected to the plurality of computing devices, wherein the event manager system is linked to the plurality of computing devices via a communicative connection between the plurality of computing devices and the event manager system, wherein each of the plurality of computing devices has its network activity monitored by at least one of the plurality of monitoring devices for an information security attack and each of the plurality of computing devices is located downstream of at least one of the plurality of monitoring devices, wherein the event manage system is within the managed computer network;

the at least one monitoring device generating the first alert in response to a first detection by a first network security device within the at least one monitoring device of an information security attack and generating the second alert in response to a second detection by a second network security device within the at least one monitoring device of an information security attack, and wherein the first alert and the second alert both include an Internet Protocol address of a source that initiated the information security attack on the at least one computing device and an identity of an intermediate upstream gateway of the managed computer network through which the attack passed, whereby the attack on the at least one computing device passed through the intermediate upstream gateway and at least one other gateway in the managed computer network and wherein the intermediate upstream gateway comprises a network node on the managed computer network that is located upstream of each of the plurality of monitoring devices and the at least one other gateway in the managed computer network;

circuitry configured to determine operating parameters of the intermediate upstream gateway based on the identity of the intermediate upstream gateway through which the attack passed included in the first alert and the second alert by comparing the identity against a gateway database;

circuitry configured to determine if the Internet Protocol address of the source that initiated the information security attack on the at least one computing device is to be disrupted based on the first and second alerts, wherein the event manager system compares the first alert and the second alert to determine whether the two alerts are similar, whereby determining that the two alerts are similar indicates that the information security attack of the first detection and the information security attack of the second detection are the same information security attack which is a real attack and the Internet Protocol address of the source that initiated the information security attack on the at least one computing device is therefore to be disrupted;

circuitry configured to generate a first set of instructions based on the operating parameters and to transmit via a network outside the managed computer network the first set of instructions to only the intermediate upstream gateway, if it is determined that the Internet Protocol address of the source that initiated the information security attack on the at least one computing device is to be disrupted, wherein the first set of instructions only instruct the intermediate upstream gateway to add the IP address of the source that initiated the information security attack to an access control list of the intermediate upstream gateway;

circuitry configured to generate a second set of instructions based on the operating parameters and to transmit via a network outside the managed computer network the second set of instructions to only the intermediate upstream gateway after a first period of time has lapsed, wherein the second set of instructions only instruct the intermediate upstream gateway to remove the IP address of the source that initiated the information security attack from the access control list of the intermediate upstream gateway;

circuitry configured to determine, during the first period of time, if a new mitigation action is to be created to address the first alert and the second alert based on a security alert database; and circuitry configured to transmit the first alert and the second alert to a command center which resides outside the managed computer network, if it is determined that the new mitigation action is to be created to address the first alert and the second alert.

14. The event manager system of claim 13 wherein the circuitry configured to transmit via a network outside the managed computer network the first set of instructions to the intermediate upstream gateway of the managed computer network comprises:

circuitry configured to determine if the first set of instructions can be transmitted to the intermediate upstream gateway of the managed computer network using a telecommunication network; and circuitry configured to transmit the first set of instructions to the intermediate upstream gateway of the managed computer network using an out-of-band network, if it is determined that the first set of instructions cannot be transmitted using the telecommunication network.

15. The event manager system of claim 13 wherein the circuitry configured to generate the first set of instructions comprises:

circuitry configured to use the identity of the intermediate upstream gateway to select an associated instruction set from an intermediate upstream gateway brand and model database; and circuitry configured to compile the first set of instructions using the selected instruction set.

16. The event manager system of claim 13 wherein the circuitry configured to transmit via a network outside the managed computer network the second set of instructions to the intermediate upstream gateway of the managed computer network comprises:

circuitry configured to determine if the second set of instructions can be transmitted to the intermediate upstream gateway of the managed computer network using a telecommunication network; and circuitry configured to transmit the second set of instructions to the intermediate upstream gateway of the managed computer network using an out-of-band network, if it is determined that the second set of instructions cannot be transmitted using the telecommunication network.

17. The event manager system of claim 13 wherein the circuitry configured to generate the second set of instructions comprises:

circuitry configured to use the identity of the intermediate upstream gateway to select an associated instruction set from an intermediate upstream gateway brand and model database; and circuitry configured to compile the second set of instructions using the selected instruction set.

18. The event manager system of claim 13 wherein the circuitry configured to transmit the first alert and the second alert to the command center comprises:

circuitry configured to determine if the first alert and the second alert can be transmitted to the command center directly using a telecommunication network; and circuitry configured to transmit the first alert and the second alert to the intermediate upstream gateway of the managed computer network using an out-of-band network, wherein the first alert and second alert is then transmitted from the intermediate upstream gateway to the command center using the telecommunication network, if it is determined that the first alert and the second alert cannot be transmitted directly using the telecommunication network.

* * * * *